United States Patent [19]
Crosson

[11] 4,408,696
[45] Oct. 11, 1983

[54] REMOVABLE ELECTRICAL RECEPTACLE
[75] Inventor: William J. Crosson, Greensburg, Pa.
[73] Assignee: Westmoreland Plastics Company, Latrobe, Pa.
[21] Appl. No.: 261,492
[22] Filed: May 7, 1981
[51] Int. Cl.³ ............................................... H02G 3/12
[52] U.S. Cl. ..................................... 220/3.6; 174/58; 220/3.9; 248/DIG. 6
[58] Field of Search .................................. 220/3.2–3.9; 174/57, 58; 248/27.3, DIG. 6
[56] References Cited
U.S. PATENT DOCUMENTS

| | | | |
|---|---|---|---|
| 2,320,400 | 6/1943 | Bedell | 220/3.6 |
| 2,423,757 | 7/1947 | Dedge | 220/3.7 X |
| 2,531,698 | 11/1950 | Petrick et al. | 220/3.7 X |
| 3,233,299 | 2/1966 | Godel | 220/3.6 X |
| 4,057,164 | 11/1977 | Maier | 174/58 X |

Primary Examiner—Allan N. Shoap
Assistant Examiner—Robert Petrik
Attorney, Agent, or Firm—Reed, Smith, Shaw & McClay

[57] ABSTRACT

An electrical receptacle wherein a body (6) includes sidewalls (8), end walls (10) and has a cover (12) at one end and a flange (14) at the opposite end. Body (6) is provided with channels (18) in sidewalls (8). Screws (20) extend through flange (14) and threadingly engage clamps (22) that are guided along channels (18) in response to rotation of screws (20) to secure the wall or ceiling structure between clamp (22) and flange (14).

2 Claims, 1 Drawing Figure

U.S. Patent
Oct. 11, 1983
4,408,696
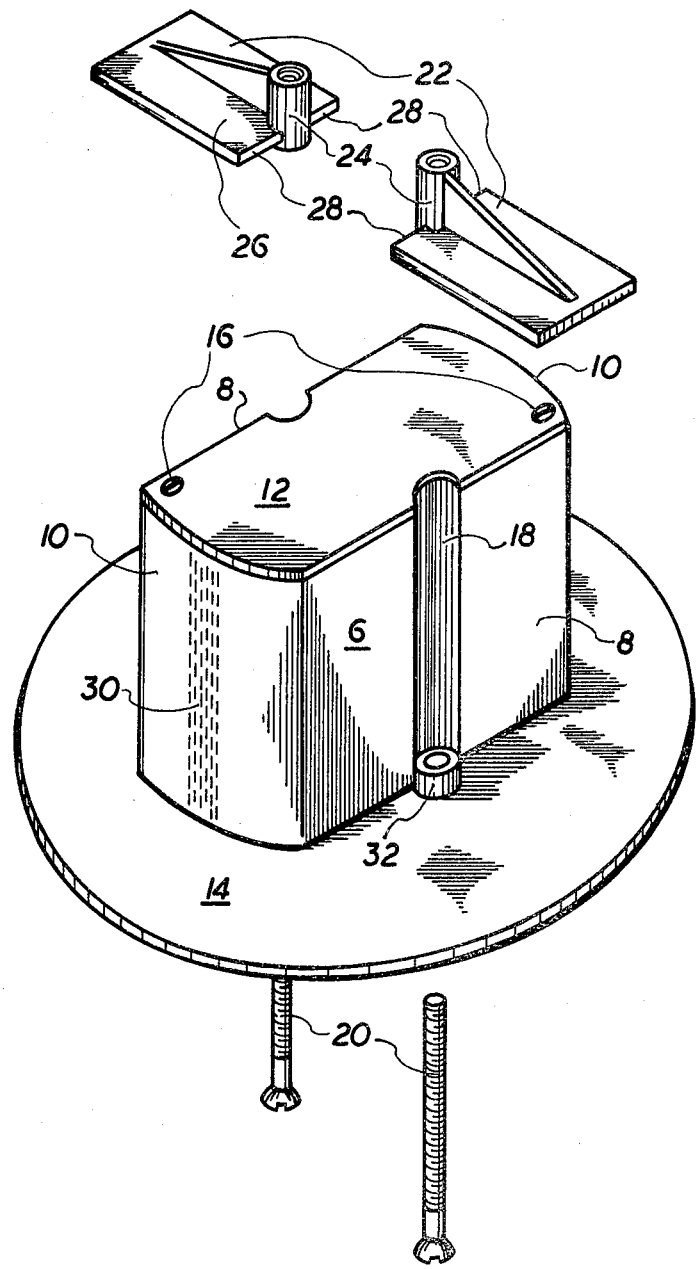

REMOVABLE ELECTRICAL RECEPTACLE

BACKGROUND OF THE INVENTION

1. Field of the Invention

The subject invention is directed to receptacles for mounting electrical apparatus in structures and, in particular, receptacles that can be readily mounted in structures and thereafter removed therefrom to allow for servicing of electrical components mounted therein.

2. Description of the Prior Art

For many years, electrical and electro-mechanical devices such as light switches and electric light bulbs have been mounted in various types of receptacles. These receptacles have been permanently fastened to the structure and could not be readily removed.

More recently, certain electrical apparatus such as lighting fixtures have included servicable components that are to be mounted in receptacles. When the components require repair or replacement, they must be removed from the receptacle. In the past, this has made service of these components difficult and has placed certain limitations on the design of the electrical apparatus itself. Accordingly, there was a need for a receptacle that could be easily mounted to the structure, and could also be removed to permit better access to the electrical components.

SUMMARY OF THE INVENTION

In accordance with the subject invention, a removable electrical receptacle includes a body that has a removable cover on one end and a flange on the other end. Along sidewalls of the body are included channels generally extending between the cover and the flange. Screws or other type fasteners extend through apertures in the flange parallel to the channels and are connected to clamps.

The clamps have a guide portion with a surface shape that is complementary to at least a part of one of the channels. The clamps also have a stop portion that cooperates with the sidewall adjacent the channel to prevent the clamps from rotating with respect to the channel.

Preferably, the channel along the body portion extends between the flange and the cover such that the clamps can be extended out of the channel and rotated adjacent the cover.

Also preferably, the fasteners comprise screws having a threaded portion extending parallel adjacent the body channel and that threadingly engage the clamps such that the clamps travel along the channels in response to rotation of the screws.

Other details, objects and advantages of the invention will become apparent as the following description of a presently preferred embodiment proceeds.

BRIEF DESCRIPTION OF THE DRAWINGS

The accompanying FIGURE is an exploded perspective view of the presently preferred embodiment of the invention.

DESCRIPTION OF A PREFERRED EMBODIMENT

As shown in the FIGURE, the electrical receptacle of the preferred embodiment includes a body 6 that is generally rectangular in cross-section and is provided with sidewalls 8 and endwalls 10. A cover 12 is fastened to one end of body 6 and an external flange 14 is fastened to the other end. Cover 12 is fastened to a body 10 by screws 16 or other fastening means.

Body 6 includes channels 18 in sidewalls 8. Channels 18 longitudinally extend in the general direction between cover 12 and flange 14. Preferably, channel 18 extends the entire length of sidewall 8 as shown in the FIGURE.

The receptacle is further provided with fasteners such as screws 20 that extend through apertures in flange 14 with the threaded ends parallel adjacent channels 18. Screws 20 are threadingly engaged with clamps 22. Preferably, clamps 22 and screws 20 are self-tapping. Clamps 22 include guide portions 24 and retainer portions 26. The surface of guide portion 24 corresponds to at least a portion of channel 18 such that guide portion 24 can pass through channel 18. The ends of retainer portions 26 form stops 28.

With clamps 22 threadingly engaged with screws 20, guide portions 24 are maintained in channels 18. With guide portion 24 in channel 18, stops 28 cooperate with the sidewalls 8 adjacent channel 18 to prevent clamps 22 from rotating as screws 20 are turned. Accordingly, clamps 22 do not rotate with respect to channels 18 and move along channels 18 in response to the turning of screws 20.

An internal track 30 or other appropriate means for mounting electrical apparatus is fastened to the interior surface of end walls 10.

Preferably, the receptacle further includes sleeves 32 that are located about the apertures in flange 14. The inner diameter of sleeve 32 is such that the tolerance between the inner diameter of sleeve 32 and the threaded portion of screw 20 is close enough so that screws 20 are maintained substantially parallel to the longitudinal axis of channel 18.

In using the embodiment shown in the FIGURE, the electrical apparatus, including serviceable components, are mounted on internal track 30 while cover 12 is removed from body 6. Cover 12 is then fastened to body 6 and screws 20 are extended through sleeves 32 and turned into clamps 22. Guide portions 24 of clamps 22 are thus within channels 18 with stops 28 adjacent sidewalls 8 of body 6 to prevent clamps 22 from rotating when screws 20 are turned.

A hole is provided in the wall or ceiling where the receptacle is to be mounted. To insert the receptacle in the hole when channel 18 does not extend completely to cover 12, the receptacle is canted sufficiently so that retainer portions 26 which extend away from body 6 clear the edges of the hole.

In the embodiment of the FIGURE, channels 18 extend completely across sidewalls 8 from flange 14 to cover 12. To insert this receptacle into the hole, clamps 22 are started onto the ends of screws 20 and screws 20 are extended through sleeves 32 to position clamps 22 beyond the cover end of channel 18. Clamps 22 are then rotated until retainer portions 26 are adjacent cover 12 and the receptacle is inserted into the hole.

With the receptacle thus inserted, clamps 22 are again turned until stops 28 are parallel adjacent sidewall 8 and retainer portions 26 extend outwardly away from body 6. Clamps 22 are then returned along channel 18 by withdrawing screws 20 through flange 14 until they engage the back surface of the wall or ceiling. Screws 20 are then turned to draw up clamps 22 until the wall or ceiling is securely maintained between retainer portions 26 and flange 14.

To remove the receptacle for servicing the electrical components, the above procedure is merely reversed.

While a presently preferred embodiment of the invention is shown and described, it is to be understood that the invention is not limited thereto but may be otherwise variously embodied within the scope of the following claims.

I claim:

1. A removable receptacle for electrical apparatus, said receptacle comprising:

a receptacle body having a side wall and an end wall and having a removable cover on one end and a peripheral, external flange on the opposite end, said body having at least one channel in said side wall along the outer surface thereof between said removable cover and said peripheral, external flange;

fastening means having threads on one end and a head on the opposite end, said fastening means extending through an aperture in said peripheral, external flange such that the threaded portion of said fastening means is maintained substantially parallel adjacent to the channel in the side wall of said receptacle body;

a sleeve member provided in juxtaposition to the aperture of sufficiently large diameter to allow the threaded portion of said fastening means to pass, but of small enough diameter to maintain said fastening means substantially orthogonal with respect to said peripheral, external flange; and at least one clamp threadingly connected to said fastening means, said clamp having a guide portion defining a sleeve that has a surface complimentary to and maintained within the channel such that said guide portion guides said clamp axially of said channel, said clamp further including a retainer portion, said retainer portion including edge portions extending laterally from opposing sides of said sleeve to act as stops that cooperate with the surface of the side wall of said receptacle body adjacent and outside said channel to prevent said clamp from rotating when said fastening means is turned.

2. The receptacle of claim 1 further comprising:

mounting means connected to the interior portion of said body for replaceably mounting the electrical apparatus to said receptacle.

* * * * *